United States Patent
Daman

(10) Patent No.: US 10,752,172 B2
(45) Date of Patent: Aug. 25, 2020

(54) SYSTEM AND METHOD TO CONTROL A VEHICLE INTERFACE FOR HUMAN PERCEPTION OPTIMIZATION

(71) Applicant: Honda Motor Co., Ltd., Tokyo (JP)

(72) Inventor: Laith Daman, Novi, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/356,347

(22) Filed: Mar. 18, 2019

(65) Prior Publication Data

US 2019/0283672 A1 Sep. 19, 2019

Related U.S. Application Data

(60) Provisional application No. 62/644,658, filed on Mar. 19, 2018.

(51) Int. Cl.
*B60R 1/00* (2006.01)
*G06K 9/00* (2006.01)
*B60W 50/14* (2020.01)

(52) U.S. Cl.
CPC ............... *B60R 1/00* (2013.01); *B60W 50/14* (2013.01); *G06K 9/00845* (2013.01); *B60R 2300/8066* (2013.01); *B60W 2050/146* (2013.01)

(58) Field of Classification Search
None
See application file for complete search history.

(56) References Cited

U.S. PATENT DOCUMENTS

| | | |
|---|---|---|
| 8,362,889 B2 | 1/2013 | Komori |
| 9,142,071 B2 | 9/2015 | Ricci |
| 10,134,193 B2 * | 11/2018 | Ahn ................. G06F 1/3231 |
| 10,247,941 B2 * | 4/2019 | Fursich ............ G02B 27/0093 |
| 10,412,307 B2 * | 9/2019 | Gao ................... G06K 9/00456 |
| 2007/0101290 A1 | 5/2007 | Nakashima et al. |
| 2013/0152002 A1 | 6/2013 | Menczel et al. |
| 2014/0233858 A1 * | 8/2014 | Yamamoto ......... G06K 9/00268 382/195 |
| 2014/0236383 A1 | 8/2014 | Nagatomi et al. |
| 2015/0178998 A1 | 3/2015 | Babich et al. |
| 2015/0105976 A1 * | 4/2015 | Shikii .................... B60K 37/06 701/36 |
| 2015/0261996 A1 * | 9/2015 | Kim ................... H04N 5/23229 348/14.03 |

(Continued)

*Primary Examiner* — Fekadeselassie Girma
(74) *Attorney, Agent, or Firm* — Rankin, Hill & Clark LLP

(57) ABSTRACT

A computer-implemented method for controlling a vehicle interface system in vehicle includes receiving images of a driver from an image capture device and determining a population group based on the images. The method includes identifying a human perception condition of the driver that is characteristic of the population group. The human perception condition limits an ability of the driver to perceive a driving situation of a vehicle operation and a stimulus output that conveys information to the driver in the vehicle about the driving situation of the vehicle operation. The stimulus output is controlled by the vehicle interface system. The method includes modifying the stimulus output into an optimal stimulus output that can be perceived by the driver with the human perception condition, and controlling the vehicle interface system to provide the optimal stimulus output to the driver during the vehicle operation.

20 Claims, 3 Drawing Sheets

(56) References Cited

U.S. PATENT DOCUMENTS

| | | | |
|---|---|---|---|
| 2015/0370318 A1* | 12/2015 | Yamaguchi | G06F 3/017 345/157 |
| 2016/0085218 A1* | 3/2016 | Pesonen | G05B 19/0428 700/28 |
| 2016/0101784 A1* | 4/2016 | Olson | B60K 35/00 340/576 |
| 2016/0176409 A1 | 6/2016 | Kirsch et al. | |
| 2016/0269788 A1* | 9/2016 | Jones | H04N 21/4781 |
| 2016/0379261 A1* | 12/2016 | Avalos | G06Q 30/0261 705/14.58 |
| 2017/0129405 A1* | 5/2017 | Oba | B60R 1/00 |
| 2017/0154513 A1* | 6/2017 | Hariri | B60N 2/002 |
| 2017/0196451 A1* | 7/2017 | Tian | A61B 3/113 |
| 2017/0286752 A1* | 10/2017 | Gusarov | G06T 13/40 |
| 2017/0309215 A1* | 10/2017 | Perdices-Gonzalez | G09G 3/3208 |
| 2018/0352112 A1* | 12/2018 | Nelson | H04N 1/504 |
| 2018/0357233 A1* | 12/2018 | Daze | H04L 67/36 |
| 2019/0009786 A1* | 1/2019 | Liu | B60C 23/02 |
| 2019/0054244 A1* | 2/2019 | Amschler | A61M 5/329 |
| 2019/0058248 A1* | 2/2019 | Kopelman | H01Q 1/24 |
| 2019/0110034 A1* | 4/2019 | Kalantari | G03B 21/10 |
| 2019/0222890 A1* | 7/2019 | Golan | A63F 13/88 |
| 2019/0299830 A1* | 10/2019 | Alequin | A61H 9/005 |
| 2019/0373318 A1* | 12/2019 | Yu | H04N 21/4532 |

\* cited by examiner

SYSTEM AND METHOD TO CONTROL A VEHICLE INTERFACE FOR HUMAN PERCEPTION OPTIMIZATION

BACKGROUND

Vehicle manufacturers standardize vehicle interface systems (e.g., visual, sound, and haptic interfaces) across different platforms and slightly modify the interfaces to fit regional regulation conformances to global market. However, these standard interfaces fail to provide basic functions (e.g., communicate information to the driver, provide operator controls) that are effective for all drivers. In particular, these standardized interfaces are not optimal for all individual human perceptions, since individual human perceptions can vary based on gender and age group. Thus, some drivers may not be able to readily perceive information about the vehicle and driving situations.

BRIEF DESCRIPTION

According to one aspect, a computer-implemented method for controlling a vehicle interface system in vehicle includes receiving images of a driver from an image capture device, determining a population group based on the images, and identifying a human perception condition of the driver that is characteristic of the population group. The human perception condition limits an ability of the driver to perceive a driving situation of a vehicle operation and a stimulus output that conveys information to the driver in the vehicle about the driving situation of the vehicle operation. The stimulus output is controlled by the vehicle interface system. The method also includes modifying the stimulus output into an optimal stimulus output that can be perceived by the driver with the human perception condition, and controlling the vehicle interface system to provide the optimal stimulus output to the driver during the vehicle operation.

According to another aspect, a system for controlling a vehicle interface system in vehicle includes an image capture device that captures images of a driver and an output device that provides a stimulus output that conveys information to the driver in the vehicle about a driving situation of a vehicle operation. A processor is operably connected for computer communication to the image capture device and the output device. The processor determines a population group based on the images and determines a human perception condition of the driver that is characteristic of the population group. The human perception condition limits an ability of the driver thereby inhibiting the perception of the driver of the driving situation of the vehicle operation. Further, the processor modifies the stimulus output based on the population group and the human perception condition so that the stimulus output can be perceived by the driver during the vehicle operation.

According to a further aspect, a non-transitory computer-readable storage medium including instructions that when executed by a processor, causes the processor to receive images of a driver from an image capture device and determine a population group based on the images. The population group is associated with a human perception condition limits an ability of the driver to perceive a driving situation of the vehicle. Further, the processor determines a cooperative stimulus output and a command stimulus output associated with the population group. The cooperative stimulus output and the command stimulus output can be perceived by the driver with the human perception condition. The processor also identifies a trigger threshold based on the population group. The processor yet further controls the vehicle interface system to perform the cooperative stimulus output in response to a modification of a vehicle system and the trigger threshold not being met and controls the vehicle interface system to perform the command stimulus output in response to the vehicle being in operation and the trigger threshold being met.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1A:
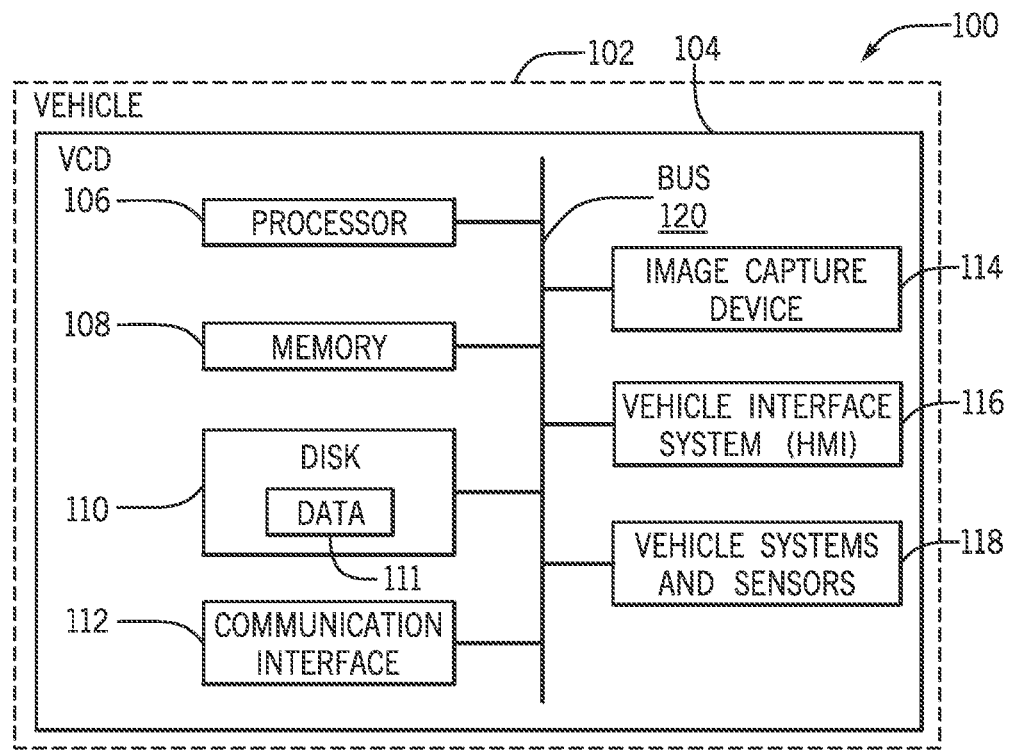
FIG. 1A is an exemplary operating environment for implementing methods and systems for controlling a vehicle interface system in a vehicle according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/ or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", of display device, as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Figure 1B:
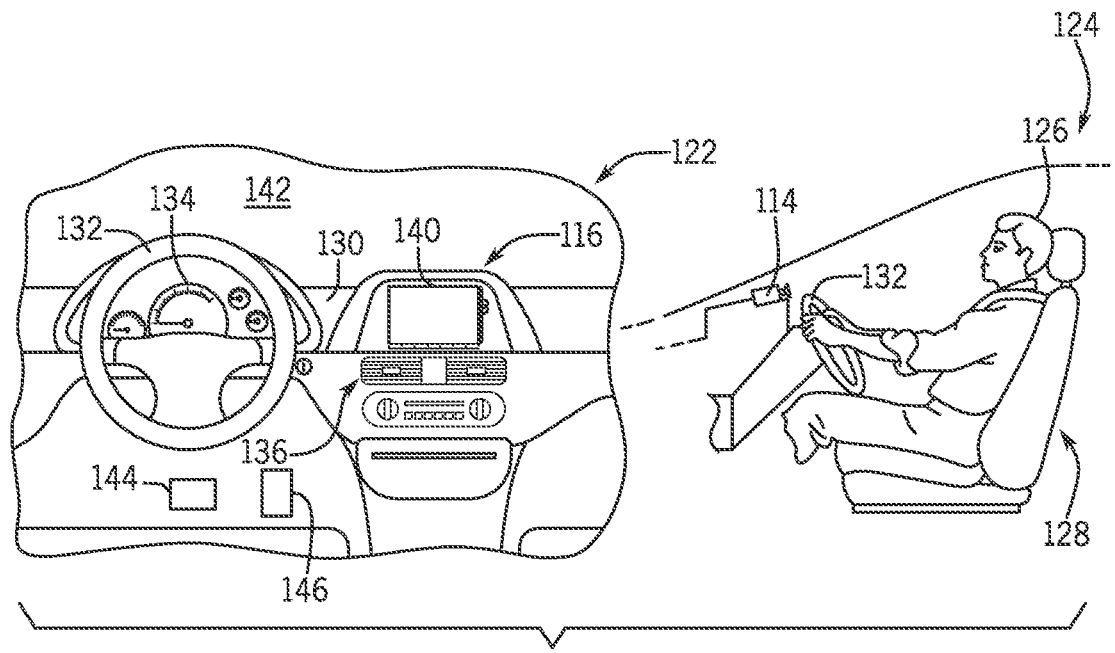
FIG. 1B is an interior view and a side interior view of the vehicle of FIG. 1A showing components of the vehicle interface system according to an exemplary embodiment.

Generally, the systems and methods discussed herein configure a vehicle interface system (e.g., a human machine interface (HMI)) in a vehicle that is optimal for human perception by a driver of the vehicle. The configuration of the vehicle interface system is customized for the driver based on the population group and the human perception conditions of the driver. Optimizing the vehicle interface system ensures information is presented in a manner perceptible by the driver considering the driver's human perception conditions and the current driving situation. Referring now to the drawings, wherein the showings are for purposes of illustrating one or more exemplary embodiments and not for purposes of limiting the same, FIG. 1A is an exemplary operating environment for implementing methods and systems for controlling a vehicle interface system in a vehicle according to an exemplary embodiment. Further, FIG. 1B is a schematic diagram of the interior and a side view of the interior of the vehicle of FIG. 1A including exemplary components of the vehicle interface system according to an exemplary embodiment. The components of the system shown in FIGS. 1A and 1B, as well as the components of other systems, hardware architectures, and software architectures discussed herein, can be combined, omitted, or organized into different architectures for various embodiments, including embodiments utilized outside of a vehicle.

In FIG. 1A, a system 100 for controlling a vehicle interface system can include and be implemented with a vehicle 102. As shown in FIG. 1B, a driver 126 can be situated in the vehicle 102, for example, on a seat 128. Referring again to FIG. 1A, the vehicle 102 can include a vehicle computing device (VCD) 104 with provisions for processing, communicating, and interacting with various components of the vehicle 102 and components of the system 100. The VCD 104 can be, for example, a telematics control unit (TCU), a head unit, an electronic control unit (ECU), or a portable device, operably connected for computer communication with the VCD 104. Generally, the VCD 104 includes a processor 106, a memory 108, a disk 110, a communication interface 112, an image capture device 114, a vehicle interface system 116 (e.g., HMI), and vehicle systems and sensors 118. These components can be operatively connected for computer communication via a bus 120 and/or other wired or wireless technologies as facilitated by the communication interface 112.

The processor 106 can include logic circuitry with hardware, firmware, and software architecture frameworks for facilitating image processing and control of the vehicle interface system 116. Thus, in some embodiments, the processor 106 can store application frameworks, kernels, libraries, drivers, application program interfaces, among others, to execute and control hardware and functions discussed herein. In some embodiments, the memory 108 and/or the data store (e.g., disk) 110 can store similar component as the processor 106 for execution by the processor 106. As will be discussed in further detail herein, the memory 108 and/or the disk 110 can store human perception data 111. The human perception data 111 can include information (e.g., look-up tables, profiles) of human perception conditions associated with a population group. In some embodiments, the human perception data 111 can be stored remotely (e.g., a remote server) and accessed by the processor 106 via the communication interface 112 over a network (not shown).

The communication interface 112 can include software and hardware to facilitate data input and output between the components of the system 100. Specifically, the communication interface 112 can include network interface controllers (not shown) and other hardware and software that manages and/or monitors connections and controls bi-directional data transfer between the communication interface 112 and other components via the bus 120 and/or other wired and wireless technologies. For example, in some embodiments, the vehicle 102 configured with the communication interface 112 can communicate over networks (not shown) with servers and/or entities operable for computer communication over the network, other vehicles, and infrastructures via one or more wireless and/or wired communication protocols as discussed herein.

The image capture device 114 can be any type of image capture device and/or sensor, for example, a charge-coupled device sensor (CCD sensor), a complementary metal-oxide-semiconductor (CMOS), or a hybrid semiconductor imaging technology. In the embodiments discussed herein, the image capture device 114 can be a camera mounted within the vehicle 102 to capture images of the interior of the vehicle 102. In particular, in order to detect and determine a population group and human perception conditions, the image capture device 114 can capture images of the driver, for example, the head of the driver, the face of the driver, limbs of the driver, other body parts of the driver, etc. As an illustrative example, a side view 124 of the interior of the vehicle 102 is shown in FIG. 1B with an image capture device 114 mounted above a steering wheel 132 and directed towards the face of the driver 126. As will be described in more detail herein, it is understood that the image capture device 114 can be located in other areas of the vehicle 102 than the location shown in the side view 124. In some embodiments, which will be discussed in more detail herein, the image capture device 114 can also capture images of the driver over time to track and determine limited mobility (e.g., limited range of motion) of the driver.

The vehicle systems and sensors 118 can include various vehicle sensors that sense and/or measure data internally and/or externally from the vehicle 102. More specifically, vehicle systems and sensors 118 can include vehicle sensors for sensing and measuring a stimulus (e.g., a signal, a property, a measurement, a quantity) associated with the vehicle 102 and/or a particular vehicle system of the vehicle 102. In some embodiments, the vehicle systems and sensors 118 can provide vehicle operating data to the processor 106 for controlling the vehicle interface system 116. Further, in some embodiments, the processor 106 can control the vehicle systems and sensors 118 to provide additional optimized feedback to the driver.

As mentioned above, the processor 106 facilitates control of the vehicle interface system 116 to provide feedback to the driver 126 that is optimized for perception for the individual driver 126. Generally, the vehicle interface system 116 encompasses functions for interaction between the vehicle 102 and the driver and/or vehicle occupants. For example, the vehicle interface system 116 can inform the driver about vehicle operations and driving situations including the surrounding environment of the vehicle. The vehicle interface system 116 also allows the driver 126 to provide input and/or control various vehicle systems and vehicle functions. Accordingly, the vehicle interface system 116 can include components and functions used to provide feedback (e.g., information) to the driver 126 and/or receive input from the driver 126.

To provide these basic functions, the vehicle interface system 116 can include a display portion and an input portion. In some embodiments, the vehicle interface system 116 is a human machine interface (HMI) and/or a heads-up display (HUD) located in the vehicle 102. The vehicle interface system 116 can receive one or more user inputs from one or more users (e.g., the driver 126, vehicle occupants). The input portion of the vehicle interface system 116 may enable a user, such as a driver or vehicle occupant, to interact with or provide input, such as user input, gestures, clicks, points, selections, voice commands, etc. to the vehicle 102, the VCD 104, and/or the vehicle systems and sensors 118. For example, in some embodiments a user can enable the control features of the vehicle 102 and/or the vehicle systems and sensors 118 by interacting with the vehicle interface system 116. As an example, the input portion of the vehicle interface system 116 can be implemented as a touch screen, a touchpad, a track pad, one or more hardware buttons (e.g., on a radio or a steering wheel), one or more buttons, such as one or more soft buttons, one or more software buttons, one or more interactive buttons, one or more switches, a keypad, a microphone, one or more sensors, etc. In one or more embodiments, the vehicle interface system 116 can be implemented in a manner which integrates a display portion such that the vehicle interface system 116 both provides an output (e.g., renders content as the display portion) and receives inputs (e.g., user inputs). An example of this can be a touch screen. Other examples of input portions may include a microphone for capturing voice input from a user.

As mentioned above, the vehicle interface system 116 can provide feedback and/or information to the driver 126. The feedback can be provided in one or more modes, for example, visual, auditory, and/or tactile. For example, the vehicle interface system 116 can display information (e.g., graphics, warnings, and notifications). Thus, the vehicle interface system 116 can generate information, suggestions, warnings, and/or alerts and provide the same to a vehicle operator on a display device (e.g., display portion) of the vehicle interface system 116. The information, warnings, etc., can include, but are not limited to, one or more navigation maps, symbols, icons, graphics, colors, images, photographs, videos, text, audible information, among others. The vehicle interface system 116 can also include other systems that provide audible and/or tactile/haptic feedback to a user. For example, auditory alerts can be provided via speakers integrated with the vehicle interface system 116. As another example, an active force pedal (AFP) can be included as part of an acceleration pedal in the vehicle 102 to provide active feedback force to a driver's foot as the driver pushes the acceleration pedal. Another further example, tactile and/or haptic feedback can be provided via a steering wheel.

The vehicle 102 and the vehicle interface system 116, including exemplary output and input portions as described above, will now be discussed with reference to FIG. 1B, which illustrates an exemplary interior 122 of the vehicle 102 and an exemplary side view 124 of the interior 122. The vehicle interior 122 may include, for example, a dashboard 130, a steering apparatus such as a steering wheel 132, an instrument panel 134, a center portion 136, a display device 140, a windshield 142, a brake pedal 144, and an accelerator pedal 146. One or more of these components can be controlled to provide functions associated with the vehicle interface system 116.

The center portion 136 can include one or more devices associated with the interior 122 of the vehicle 102, including but are not limited to: audio devices, video devices, navigation devices, as well as any other types of devices. In addition, the center portion 136 can be associated with controls for one or more systems (e.g., vehicle systems and sensors 118) of the vehicle 102 including, but not limited to: climate control systems, radio and sound systems, and other types of systems. These devices can be configured for interaction with the driver. For example, the vehicle interface system 116 can include buttons, a keypad, or other types of input devices.

In FIG. 1B, the vehicle 102 includes a display device 140, which can be part of the vehicle interface system 116 for displaying information from the vehicle 102 and/or the vehicle systems and sensors 118. The display device 140 can include a touchscreen for use as a user input device for the vehicle interface system 116. In some embodiments, the display device 140 can be located in any portion of the vehicle 102, or can be a portable device (not shown). For example, display device 140 can be located within instrument panel 134. In another embodiment, the vehicle interface system 116 can include a heads up projection (HUD) type display that is configured to project an image onto one or more surfaces of the vehicle 102, such as windshield 142.

The display device 140 can be configured to present visual information for the vehicle 102. For example, the vehicle interface system 116 can inform the driver 126 with visual or auditory alerts or information about vehicle systems and sensors 118, a current driving situation of the vehicle 102, the surrounding environment of the vehicle 102, among others. Additionally, as discussed above, in some embodiments, the accelerator pedal 146 can include an active force pedal (AFP) that can provide active feedback force to a driver's food as the driver pushes the accelerator pedal 146.

Figure 2:
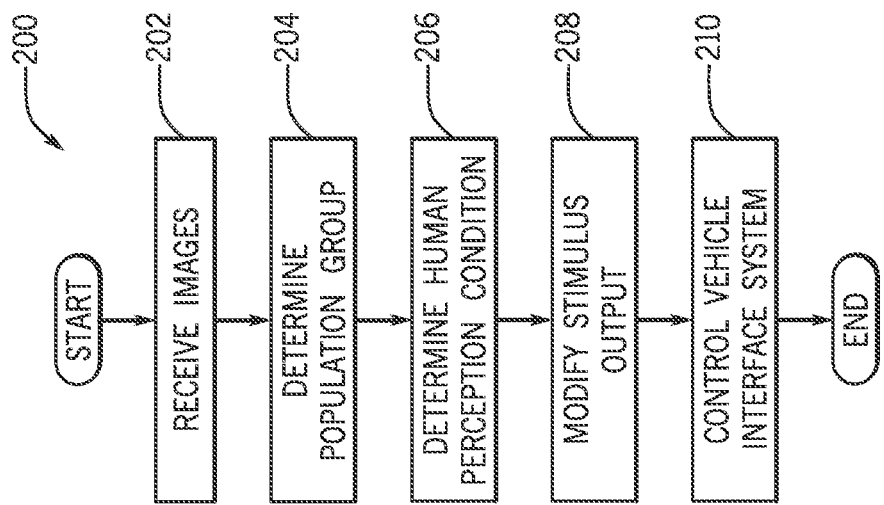
FIG. 2 is a flow diagram of a method for controlling a vehicle interface system in a vehicle according to an exemplary embodiment.

Referring now to FIG. 2, a method 200 for controlling the vehicle interface system 116 in the vehicle 102 will now be described according to an exemplary embodiment. FIG. 2 will be described with reference to the components of FIGS. 1A, and 1B. At block 202, the method 200 includes receiving images of a driver 126 from an image capture device 114. The images of the driver 126 can include, for example, the head of the driver 126, the face of the driver 126, limbs of the driver 126, other body parts of the driver 126, etc. To acquire these images, the image capture device 114 can be positioned in various areas of the vehicle 102, for example, on a column of the steering wheel 132, the instrument panel 134, and/or on the windshield 142. As shown in side view 124, the image capture device 114 is mounted above the steering wheel 132. The processor 106 can receive the images from the image capture device 114 periodically and/or a predetermined times. In some embodiments, the processor 106 can store the images at the memory 108 and/or the disk 110 to access at a later time.

At block 204, the method 200 includes determining a population group based on the images. A population group is defined by characteristics (e.g., traits) and can be based on population demographic data. More specifically, a population group, as used herein, describes a characteristic and/or a classification of the driver 126. For example, the population group can be a human demographic group defined by one or more characteristics, for example, an age, an age group, a gender, among others. The population group can be a discrete value or a numeric value. Exemplary population groups include, but are not limited to, newborn, infant, child, teen, young adult, adult, advanced age, male, and female. In some embodiments, the population group includes more than one characteristics and/or classification of the driver.

In one embodiment, the processor 106 determines the population group based on the images from the image capture device 114. For example, in one embodiment, the processor 106 can determine an age of the driver 126 and a gender of the driver 126 based on the images. In some embodiments, based on the determined age of the driver 126 and/or the determined gender of the driver 126, the processor 106 can determine the population group of the driver 126. The processor 106 can use image processing techniques including facial recognition techniques to determine the population group based on the images. For example, using facial recognition techniques, the processor 106 can estimate an age and/or determine a gender based on the face of the driver 126 identified in the images. In one embodiment, based on the estimated age, the processor 106 can determine the population group using the human perception data 111. For example, by accessing a look-up table or aggregated demographic and/or population data from the memory 108 and/or the disk 110.

For example, if the estimated age is 70, and the look-up table defines a population group associated with an age in a range of 65-80 as an advanced age, then the processor 106 determines the population group as advanced age. In other embodiments, the processor 106 can determine the population group based on a profile (e.g., stored at the memory 108 and/or the disk 110) associated with the driver 126. Thus, the processor 106 can identify the driver 126 based on the images and determine the population group based on stored information in a profile associated with the identified driver 126.

At block 206, the method 200 includes identifying a human perception condition of the driver 126. A human perception condition, as used herein, is a characteristic of the population group and/or a characteristic associated with the population group. In particular, the human perception condition is a characteristic that limits the perception of the driver 126. Thus, the human perception condition inhibits and/or diminishes the driver's perception of a driving situation of a vehicle and/or operation of the vehicle 102 (e.g., driving situations involving the vehicle 102, surroundings of the vehicle 102). Additionally, the human perception condition inhibits and/or diminishes the driver's perception of a stimulus output that conveys information to the driver 126 in the vehicle 102 about the driving situation of the vehicle operation. The driver's perception can include the ability to see, hear, or become aware of something (e.g., a driving situation, an object, a stimulus output) through the senses. In the embodiments discussed herein, the stimulus output is controlled by the vehicle interface system 116. For example, the stimulus output can be visual, auditory and/or tactile output provided by the vehicle interface system 116 associated with the vehicle 102.

As an illustrative example, a human perception condition is a human behavior or a human disorder that can be physiologically derived and that impacts the driver's situational awareness with the vehicle 102 and/or the environment surrounding the vehicle 102. In particular, the human perception condition limits the ability of the driver 126 to perceive output provided by the vehicle interface system 116 about a current driving situation of vehicle operation. Thus, a human perception condition can impact the sensory system of the driver 126. For example, eye conditions, hearing conditions (e.g., auditory sensitivities), somatosensory (e.g., tactile) conditions. A human perception condition can also impact the behavior of the driver 126. For example, muscular and/or skeletal conditions that limit range of motion and/or head/neck mobility. Exemplary human perception conditions will be described herein with reference to Table 1.

In one embodiment, identifying the human perception condition of the driver that is characteristic of the population group includes the processor 106 accessing a look-up table (e.g., the human perception data 111) of human perception conditions associated with the population group. As mentioned above, a look-up table of human perception conditions (e.g., the human perception data 111) associated with the population group can be stored at the memory 108, which is accessible by the processor 106. An exemplary look-up table including human perception conditions is shown below in Table 1. For simplicity, the look-up table only includes information for advanced age male population groups, however, the look-up table can include information for other ages, genders, and human perception conditions.

TABLE 1

| Age Population group | Gender Population group | Vehicle Condition | Exemplary Human Perception Condition | Optimal Stimulus/ HMI profile |
|---|---|---|---|---|
| Advanced Age (e.g., 65+) | Male | Day | a.) Low visual acuity. b.) Limited visual colors. c.) Low auditory acuity. | a.) Increase font size, increase icon size, selective display of information. b.) Remove blue |

TABLE 1-continued

| Age Population group | Gender Population group | Vehicle Condition | Exemplary Human Perception Condition | Optimal Stimulus/ HMI profile |
|---|---|---|---|---|
| | | | d.) Slow eye movement. e.) Mobility impairments, limited degrees of freedom, sensitivity to high vibrations. | colors, increase contrast c.) Increase auditory warning volume levels. d.) Increase display duration of visual warnings, increase auditory warning duration. e.) Adjust steering wheel and seat haptics by replacing tactile steering feedback with visual warnings, and auditory warnings. |
| Advanced Age (e.g., 65+) | Male | Night | a.) Diminished night vision. | a.) Replace white text/images with gray text/images. |

As shown in Table 1, if the population group of the driver 126 is an advanced age male, and a current environmental condition is day, the driver 126 can have one or more of the exemplary human perception conditions listed in column 4. For each human perception condition, one or more actions (e.g., stimulus output) of the vehicle interface system 116 can be controlled to mitigate the human perception condition, and thus improve the driver's perception of the vehicle interface system 116. As an illustrative example, for a human perception condition of low visual acuity, the vehicle interface system 116 can increase font size, increase icon size, and/or selectively display specific types of information on the display device 140.

As shown in Table 1 above, in one embodiment, which will be discussed in more detail with FIG. 3, the human perception condition is a mobility impairment or limited mobility, for example, limited neck movement or limited range of motion that limits mobility of the driver. Identifying the human perception condition of the driver that is characteristic of the population group can include identifying the limited mobility (e.g., limited neck movement) based on the population group alone (e.g., age, gender) and/or the images. In other words, the processor 106 can identify a behavior of the driver indicative of limited mobility and/or limited range of motion based on the images. For example, the processor 106 can analyze a series of images from the image capture device 114 for head and/or neck patterns indicative of limited mobility and/or limited range of motion. In some embodiments, the processor 106 can determine limited mobility for a particular side of the driver 126 and/or a particular limb of the driver 126. For example, the driver 126 can have a larger range of motion over their right shoulder than their left shoulder. Again, this limited mobility can be identified based on the population group alone (e.g., age, gender) and/or the images as discussed above.

Referring again to FIG. 2, at block 208, the method 200 includes modifying the stimulus output. As mentioned above, the vehicle interface system 116 outputs a stimulus output (e.g., visual, auditory, tactile output) that provides feedback and/or information to the driver 126. For example, the vehicle interface system 116 can provide a visual warning (e.g., visual stimulus output) on the display device 140 that conveys information to the driver 126 in the vehicle 102 about a driving situation of a vehicle operation. Based on the population group and the human perception condition, the processor 106 can modify the stimulus output into an optimal stimulus output that can be perceived by the driver 126 with the human perception condition.

In other embodiments, at block 208, the processor 106 can simply modify the stimulus output based on the population group and the human perception condition so that the stimulus output can be perceived by the driver 126 during the vehicle operation. For example, the processor 106 can modify the stimulus output (e.g., into the optimal stimulus output) so that the stimulus output can be perceived by the driver 126 with the human perception condition includes modifying a feature of the stimulus output. For example, a stimulus output can include providing text on the display 140. The text can have features such as font type, font size, and font color, among others. Accordingly, one or more of the features of the stimulus can be modified. For example, the font size can be modified to increase the font size.

In one embodiment, the processor 106 determines the optimal stimulus output based on the look-up table (e.g., human perception data 111) of human perception conditions and the vehicle operation, as shown in Table 1. In other embodiments, the optimal stimulus is simply determined by the processor 106 based on the features of the HMI 116, vehicle systems and sensors 118 parameters, and the population group of the driver 126. In one embodiment, which will be described in more detail with FIG. 3 herein, the processor 106 controls the vehicle interface system 116 to modify the stimulus output to provide a visual stimulus output and an audible stimulus output to the driver 126. Accordingly, at block 210, the method 200 includes controlling the vehicle interface system 116 according to the modified stimulus output and/or the optimal stimulus output during the vehicle operation. For example, the processor 106 can control the display device 140 to provide visual stimulus output (e.g., images of the surroundings the vehicle 102) and provide audible stimulus output describing the visual stimulus output simultaneously.

As another example that illustrates the biological differences between population groups, the auditory abilities of men and women change in different ways with age. For example, males tend to lose sensitivity to higher frequency stimuli when aging as compared to the same age group of females. Thus, at block 210, the frequency and/or volume (e.g., a system parameter) of the HMI 116 that provides the audible stimulus can be modified based on a population group being male or female. As one example, when the determined population group is associated with a driver 126 that is male, the stimulus output is modified, at block 208, to use tones without high frequency elements and/or replacing the tones with more suitable lower frequency tones that can be easily identified by a population group associated with older male drivers. Accordingly, at block 210, the HMI 116 is controlled to provide a low frequency tone. Similarly, when the determined population group is associated with a driver 126 that is female, the stimulus output is modified, at block 208, to retain the high frequency of the tones. Accordingly, at block 210, for population groups associated with females, the HMI 116 retains the high frequency stimuli, unlike population groups associated with males of a similar age. Thus, the output stimulus provided is optimal to the human ear of the driver 126 based on the population group.

The method and system described above with FIGS. 1A, 1B, and 2, can be implemented with any driver of various population groups, for example, newborn, infant, child, teen, young adult, adult, advanced age. In the case of advanced age drivers, driving ability is particularly critical because of limited mobility. In particular, during driving situations of vehicle operation that require full range of head/neck motion (e.g., back-up driving scenarios), the vehicle interface system 116 may display images from a back-up camera (not shown) on the display device 140. However, due to the limited mobility of advanced age drivers, the driver's perception of the images on the display device 140 may be diminished. Thus, the vehicle interface system 116 can adjust the stimulus output to improve the perception of the vehicle surroundings to the driver 126. These embodiments will now be described in more detail with FIG. 3.

Figure 3:
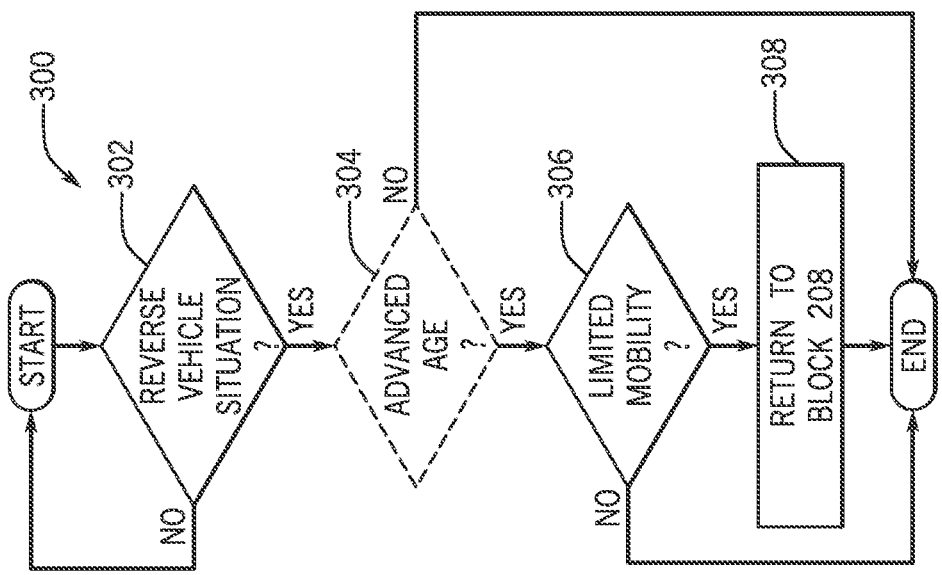
FIG. 3 is a flow diagram for a method for controlling a vehicle interface system in a vehicle where the driver has limited mobility in back-up vehicle operations according to an exemplary embodiment.

FIG. 3 illustrates a method 300 for controlling the vehicle interface system 116 in the vehicle 102 where the driver has limited mobility in back-up vehicle operations according to an exemplary embodiment. At block 302, the method 300 includes determining a current vehicle situation of vehicle operation of the vehicle 102. More specifically, it is determined if the vehicle 102 is currently in a back-up (e.g., reverse) vehicle operation. For example, the processor 106 can receive vehicle operating information from the vehicle systems and sensors 118 and determine that a back-up vehicle operation is currently underway. If the determination at block 302 is NO, the processor 106 can continue monitoring for a specific driving situation and return to the start of the method 300.

Otherwise, the method 300 proceeds to block 304. In one embodiment, upon determining that the vehicle 102 is currently in a back-up (e.g., reverse) vehicle operation (i.e., YES), the processor 106 activates the image capture device 114 so that images can be received to determine the population group of the driver 126. Accordingly, in one embodiment, at block 304, the method 300 optionally includes determining if the population group is an advanced age driver. For example, as discussed above with block 204, the processor 106 can determine the population group based on the images received from the image capture device 114. In one embodiment, the processor 106 can estimate an age of the driver 126 and determine the population group as an advanced age driver based on the age, using, for example, a look-up table. Block 304 is optional because is some situations, drivers of different population groups (e.g., other than advanced age) can have limited mobility conditions.

At block 306, the method 300 includes determining if the driver 126 has limited mobility. Said differently, the processor 106 determines the human perception condition as limited body movement. In one embodiment, as discussed above with block 206, the processor 106 can determine the human perception condition as limited body movement based on the population group as an advanced age driver, using for example, a look-up table. In other embodiments, the processor 106 can determine the human perception condition as limited body movement based on the images received from the image capture device 114. For example, as discussed above, the processor 106 can analyze a series of images from the image capture device 114 for head and/or neck patterns indicative of limited mobility and/or limited range of motion. As discussed above with block 206, in some embodiments, the processor 106 can determine limited mobility for a particular side of the driver 126 and/or a particular limb of the driver 126. For example, the driver 126 may have a larger range of motion over their right shoulder than their left shoulder. Thus, more than one limited mobility or limited mobility range can be determined and/or identified for the driver 126.

If the determination at block 306 is NO, the method 300 ends. Otherwise, the method 300 proceeds to block 308. At block 308, the method 300 returns to block 208 of FIG. 2 and modifies and/or provides a stimulus output so that the stimulus output can be perceived by the driver 126 during the vehicle operation (e.g., during the back-up vehicle operation). For example, in this embodiment, in a back-up vehicle operation, a typical stimulus output (e.g., a default vehicle system parameter) can include displaying rear-view camera images on the display 140 during the back-up vehicle operation. However, with limited mobility, the driver's perception of the images on the display device 140 may be diminished and the driver 126 may not be able to have full head swing views to monitor driving situation using the side mirrors with the display device 140. Accordingly, in addition to and/or in lieu of displaying rear-view camera images on the display 140 during the back-up vehicle operation, the processor 106 can control the vehicle interface system 116 to provide an optimal output stimulus that complements the driver's limited mobility, for example, by providing selective auditory output stimulus. For example, the vehicle interface system 116 can provide the visual output stimulus (e.g., images on the display 140) and simultaneously provide auditory output stimulus narrating the visual output stimulus. In one embodiment, the processor 106 can execute an auditory narration of the back-up vehicle operation that describes what is being displayed by the images on the display 140. As will be discussed below, the output stimulus can be provided selectively based on the limited mobility and/or the human perception condition.

Thus, as another illustrative example, the processor 106 can modify the stimulus output based on the identified limited mobility in relation to a driving situation and/or an object detected in proximity to the vehicle 102 and/or in the path of the projected vehicle back-up operation. If the driver's perception of the driving situation and/or the object is diminished or limited because of the limited mobility and/or the human perception condition, the processor 106 can modify the stimulus output to rectify the driver's perception of the object despite the limited mobility and/or the human perception condition. For example, the processor 106 can detect an object in proximity to the vehicle 104 using, for example, the image capture device 114 and/or the vehicle systems and sensors 118. In one example, the object is detected in a path of the vehicle 104. For example, if the vehicle 104 is in reverse, the object may be detected in the reverse path (e.g., behind and/or to the side) the vehicle 104.

Based on the image detection (e.g., images), the processor 106 can determine the position of the object relative to the vehicle and relative to the identified limited mobility. If the perception of the driver 126 is skewed in the same direction as the object, the output stimulus is modified to enhance the perception of the object to the driver 126 relative to the limited mobility. For example, if the driver 126 has limited mobility over their right shoulder (e.g., as determined at block 306), which skews the driver's field of view (e.g., perception) when the driver 126 turns his head to the right to look over his right shoulder, and an object is detected from the right rear of the vehicle, the processor 106 can modify the stimulus output to provide auditory narration only for the object, or other objects, in the field of view skewed by the limited mobility (e.g., right rear of the vehicle).

As another example, if the driver 126 has a larger range of motion over their right shoulder than their left shoulder (e.g., as determined at block 306), and an object is detected from the left rear of the vehicle, the processor 106 can modify the stimulus output to narrate (e.g., auditory output stimulus) only objects detected from the left rear of the vehicle. This because the driver 126 has limited mobility over their left shoulder and thus has limited neck movement to the left impairing the driver's ability to view the object over their left shoulder. As an illustrative example, the HMI 116 output an auditory output stimulus as, "Object detected to the left rear area of the vehicle."

The limited mobility that skews the driver's perception discussed above can also take forms other than vision, for example, hearing loss. As an illustrative example, if the driver 126 has poor hearing in his right ear and an object is detected to the right rear of the vehicle, the processor 106 can modify the stimulus output to provide a tactile output stimulus to the right side of the driver's body, for example, the right side of the steering wheel 132. It is understood that other types of modifications, limited mobility, and human perception conditions can be contemplated.

This modified stimulus output (e.g., optimal stimulus output) described above is perceptible by the driver during the vehicle operation to compensate for the ability of the driver limited by the human perception condition (e.g., limited mobility). Accordingly, the vehicle interface system 116 is optimized and increases safety for the driver 126 by ensuring information is presented in a manner perceptible by the driver 126 considering the driver's human perception conditions and the current driving situation.

As discussed above, the processor 106 can provide a stimulus output that can be perceived by the driver 126 during the vehicle operation (e.g., during the back-up vehicle operation). However, while the vehicle 102 is in operation, the driving situation may escalate. For example, during the back-up vehicle operation discussed with respect to FIG. 3, the vehicle may be on a course to collide with rearward obstacle or be approaching a pedestrian. A person with low visual acuity or limited mobility may not be able to fully monitor the situation. Thus, the vehicle interface system 116 can adjust the stimulus output based on the escalating driver situation to improve the response time of the driver 126. These embodiments will now be described in more detail with FIG. 4.

Figure 4:
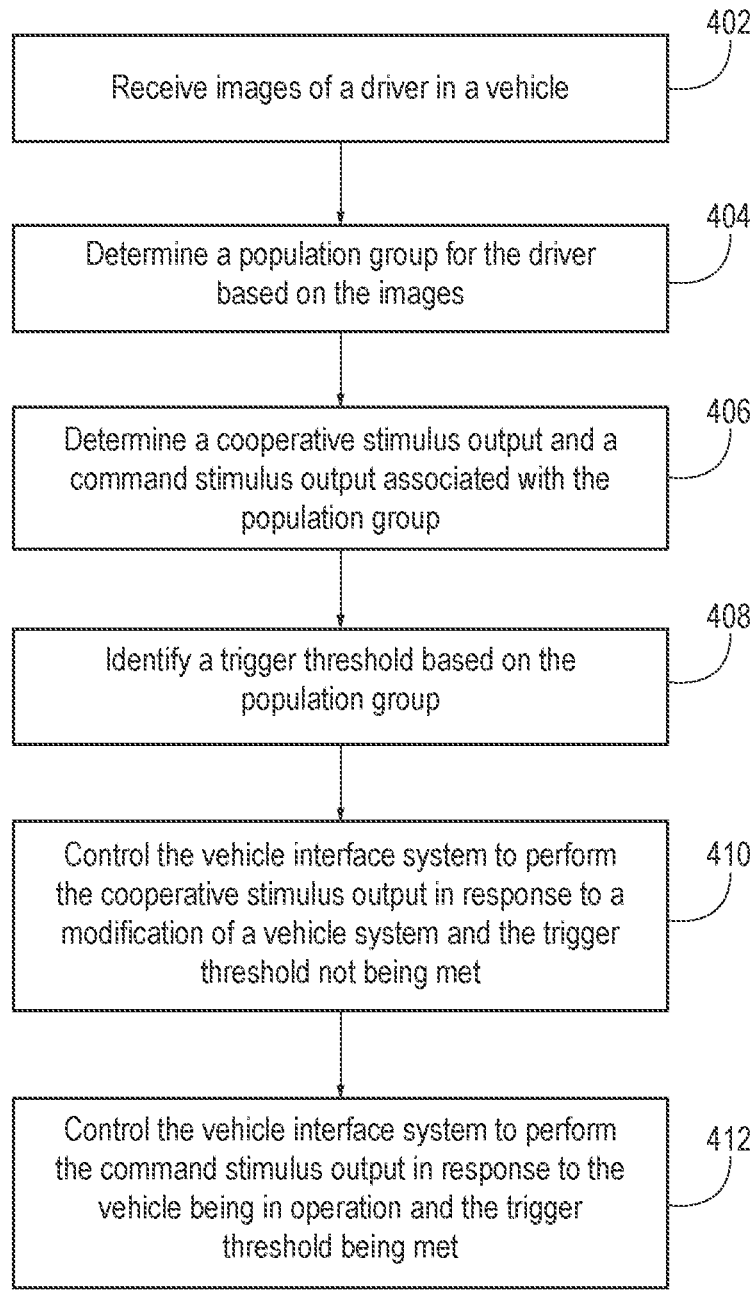
FIG. 4 is a flow diagram for a method for controlling a vehicle interface system using a trigger threshold according to an exemplary embodiment.

FIG. 4 is a flow diagram for a method for controlling a vehicle interface system using a trigger threshold according to an exemplary embodiment.

At block 402, images of a driver in a vehicle are received from an image capture device as described above with respect to FIG. 2 at block 202.

At block 404, a population group is determined based on the images. To determine the population group, the processor 106 can use image processing techniques, including facial recognition techniques, to determine the population group based on the images. For example, using facial recognition techniques, the processor 106 can estimate demographic data, such as the age and/or gender of the driver 126. In some embodiments, the demographic data may be supplemented and/or verified using additional sources, such as sensor data from the vehicle sensors 118, voice analysis, or voice recognition. Remote databases may also be queried for demographic data, such as a vendor registration database.

The demographic data for the driver 126 may be associated with a demographic profile of the driver 126. The demographic profile may be selected by the driver 126. Alternatively, the image data and/or the sensor data, voice analysis, and voice recognition may be used to identify the demographic profile of the driver 126. The demographic profile may include the population group, such that the processor 106 can determine the population group from the demographic profile of the driver 126.

At block 406, a cooperative stimulus output and a command stimulus output are determined based on the population group. The cooperative stimulus output and the command stimulus output are optimal stimulus outputs for different vehicle situations. Therefore, as the vehicle situation evolves the vehicle interface system 116 can generate responses that will escalate accordingly. As one example, suppose that the vehicle 102 is reversing but that the driver's population group indicates that the driver 126 may have a human perception condition of low visual acuity. The vehicle 102 may assess the current vehicle situation in the manner described at block 302. In another embodiment, the vehicle 102 may assess the current vehicle situation based on vehicle kinetic parameters, such as the speed of the vehicle 102, the distance between the vehicle 102 and an obstacle, the lateral movement of a the vehicle 102 in a lane on a roadway, and other parameters related to operation and/or movement of the vehicle 102.

Based on the population group of the driver 126, the cooperative stimulus output may include narrating details of the vehicle surroundings. For example, the narration may include location details of obstacles such as parked vehicles or provide an assessment of pedestrian foot traffic. The cooperative stimulus output may also provide reminders or requests. For example, the cooperative stimulus output may include narration with phrases like "please begin reversing slowly." Therefore, the driver's low visual acuity can be supplemented with an optimal stimulus that allows the driver to visualize the surroundings. Thus, the cooperative stimulus output improves the driver's perception.

The assessment of the current vehicle situation can be iteratively reassessed to determine whether the current vehicle situation should be escalated. Returning to the example of the vehicle 102 reversing and the driver 126 having low visual acuity, suppose that vehicle systems or sensors 118 determine that the vehicle 102 is approaching a rearward obstacle too quickly. The vehicle interface system 116 may employ a command stimulus output. The command stimulus output instructs the driver 126 to act. In the example scenario, the command stimulus output may narrate "stop" or "slow down immediately." Therefore rather than merely providing the driver with passive narration, the command stimulus output instructs the driver to act in a manner that can be perceived by the driver 126 with the human perception condition.

At block 408, a trigger threshold can be identified based on the population group. The trigger threshold may be identified using a threshold look-up table and the population group. The trigger threshold is the point at which the vehicle interface system 116 transitions from the cooperative stimulus output to the command stimulus output. For example, the trigger threshold may be a time to collision with an obstacle, a minimum gap distance between the vehicle 102 and an obstacle, etc. Suppose that the vehicle 102 is reversing and the cooperative stimulus output is being performed for the driver 126. The vehicle systems assess the current vehicle situation, which includes identifying objects around the vehicle 102 and current trajectories for the objects and the vehicle. If the trigger threshold is a time to collision of five seconds or less, when the vehicle systems 118 determine that the vehicle 102 will collide with a rear vehicle (not shown) in five seconds, the vehicle interface system 116 will initiate the command stimulus output. Accordingly, the command stimulus output will be performed to alert the driver of an impending adverse outcome in a manner that can be perceived by the driver 126.

The trigger threshold is set to afford the driver 126 adequate time to act when the current driving scenario escalates. Therefore, the trigger threshold may vary based on the population group. For example, an advanced age population group may characteristically require more time in order to respond to a perceived risk. Accordingly, the trigger threshold associated with the advanced age population group may be greater than the trigger threshold associated with a middle age population group. For example, if the trigger threshold is a time to collision, the trigger threshold associated with the advanced age population group may be 15 seconds, while the trigger threshold associated with a middle age population group is 5 seconds.

A teen age population group may have a shorter reaction time, but have a higher likelihood of suffering from distracted driving which reduces a driver's perception. Accordingly, the trigger threshold associated with the teen age group may not be as great as the trigger threshold associated with the advanced threshold group but be greater than the trigger threshold associated with a middle age population group. Continuing the example from above, the trigger threshold associated with a teen age population group may be 10 seconds. In this manner, the vehicle interface system 116 escalates to the command stimulus output based on a human perception condition of the driver 126 based on the driver 126 being classified as belonging to a particular population group. Therefore, the responses generated by the vehicle interface system 116 can be tailored to the driver's demographic. Furthermore, the vehicle interface system 116 can distinguish between an inert situation and a possibly dangerous situation based on the trigger threshold.

While the example above is based on a trigger threshold that is a time to collision value, a plurality of trigger thresholds can be identified based on the population group. For example, trigger threshold values may include a five-second time to collision as well as a minimum gap length of one meter. In one embodiment, if any one of the plurality of trigger thresholds is satisfied, the vehicle interface system 116 may initiate the command stimulus output. In another embodiment, a subset of the trigger thresholds must be met before the command stimulus output is initiated. For example, suppose that the trigger thresholds include a time to collision, a minimum gap distance, and activation of a blind spot monitor alert. A blind spot monitor alert indicating that there is an object in the vehicle's blind spot alone may not cause the command stimulus output to be initiated. However, the blind spot monitor alert being activated in addition to the minimum gap distance trigger threshold being met, may trigger the command stimulus output to be initiated. Thus, multiple trigger thresholds may be met to satisfy the trigger threshold for the vehicle interface system 116 to initiate the command stimulus output.

Furthermore, the trigger thresholds may be dependent on one another in varying ways based on the population group. For example, the trigger threshold may be satisfied when a first trigger threshold is met for a first population group, but for a second population group, the trigger threshold is satisfied when the first trigger threshold and a second trigger threshold are met. In other words, the minimum gap distance being satisfied alone may cause the vehicle interface system 116 to initiate the command stimulus output, whereas the blind spot monitor alert being activated may require that one or more of the time to collision and the minimum gap distance be satisfied before the vehicle interface system 116 initiates the command stimulus output. For example, the trigger threshold associated with the advanced age population group may only require that the blind spot monitor alert is activated, while the trigger threshold associated with a middle age population group requires that the blind spot monitor alert being activated and that one or more of the time to collision and the minimum gap distance be satisfied before the vehicle interface system 116 initiates the command stimulus output. Accordingly, the trigger thresholds can be hierarchically set to best accommodate the characteristics of the associated population group.

At block 410, the vehicle interface system 116 is controlled to perform the cooperative stimulus output in response to a modification of a vehicle system 118 and the trigger threshold not being met. For example, as discussed above, suppose that the vehicle 102 is put in reverse. The modification of the transmission from park to reverse may initiate the cooperative stimulus output when the trigger threshold is not met. Suppose that the determined population group of the driver 126 is the advanced age population group and the associated trigger threshold is a five second time to collision. Assuming that the vehicle 102 is placed in reverse from park and is not moving, the time to collision is greater than five seconds and accordingly, in this embodiment, the trigger threshold is not satisfied. Thus, the vehicle interface system 116 is controlled to perform the cooperative stimulus output.

The cooperative stimulus output may have a two-prong structure. For example, the cooperative stimulus output may include a scenario communication and a suggestion communication. The scenario communication may narrate the elements of the current vehicle situation. For example, the scenario communication may include communicating information from the vehicle systems and sensors 118 to the driver 126. The suggestion communication may be a communication to the driver to indicate a next step to proceed. For example, if the cooperative stimulus output is initiated in response the vehicle 102 being put in reverse, the scenario communication may indicate that an obstacle is located being the vehicle or that there is an increased amount of pedestrian foot traffic. The suggestion communication may follow the scenario communication and suggest that the driver proceed to backup. In other embodiments, the scenario communication may follow the suggestion communication.

The cooperative stimulus output may continue until the driver 126 acknowledges the cooperative stimulus output, for example, by verbally acknowledging the cooperative stimulus output or modifying the operation of the vehicle 102. Here, the driver 126 may take the car out of reverse. In this manner, in the cooperative stimulus output can be initiated and terminated without the command stimulus output being invoked. However, if invoked, the command stimulus output supersedes the cooperative stimulus output.

At block 412, the vehicle interface system 116 is controlled to perform the command stimulus output in response to the vehicle 102 being in operation and the trigger threshold being met. For example, suppose that the vehicle interface system 116 is causing the processor 106 to perform the cooperative stimulus output when the trigger threshold is satisfied. The vehicle interface system 116 will automatically transition to the command stimulus output regardless of the current output in order to interface with the driver 126. If at block 410, the vehicle interface system 116 is performing an audible cooperative stimulus output, "please begin reversing slowly," at block 412 the vehicle interface system 116 will stop mid-phrase to initiate the command stimulus output.

In some embodiments, the command stimulus output also has a two prong structure. The two prong structure includes a command followed by trigger details. For example, the command may be a word narrated audibly, an alarm, or other form of communication that encourages an immediate response from the driver 126. The command may be one or more commands and/or selected from a set of commands. The set of commands may vary based on the type of immediate response being encouraged, the trigger threshold, the population group, or the human perception condition of the driver 126.

In some embodiments, once the command of the command stimulus output is performed, the trigger details of the command stimulus output is performed. The trigger details are intended to convey what driving situation caused the command stimulus output to be initiated. For example, suppose the command increases the volume of an audio system of the vehicle 102 and is also an auditory narration that instructs the driver 126 to "stop vehicle now." This command may be followed by a trigger details that decreases the volume of the auditory system of the vehicle 102 and stating, "no space to backup" or "pedestrian detected behind." Therefore, the driver is alerted with information about the driving situation.

In other embodiments, the command of the command stimulus output may be performed iteratively until the driving situation that cause the command stimulus output to be initiated is addressed. The driving situation may be addressed by comporting with the command or modifying the vehicle operation such that trigger threshold is no longer satisfied. In the example in which the trigger threshold is a time to collision, the vehicle may be increasing speed to four miles per hour (mph). Upon the driving situation of reaching four mph, the time to collision exceeds the trigger threshold and the vehicle interface system 116 initiates the command stimulus output resulting in a command, such as, "stop vehicle now," being audibly provided to the driver 126. The command, may be iteratively provided to the driver 126 until the vehicle sensors 118 indicate the vehicle 102 is slowing down. For example, when the vehicle 102 slows to three mph, the trigger details are provided to driver 126.

To determine whether the driving situation is being addressed, the processor 106 may calculate maxima and minima for the vehicle kinetic parameters. The maxima and minima may indicate whether the driver 126 is attempting to address the driving situation even if the trigger threshold is not yet cleared. For example, if the trigger threshold is a minimum gap distance of one meter between the vehicle 102 and an obstacle, but the vehicle 102 approaches the obstacle until the vehicle is 0.5 meters from the obstacle. The processor 106 may calculate the minima for the gap distance to determine if rather than the distance between the vehicle 102 and the obstacle decreasing, the distance between the vehicle 102 and the obstacle is increasing. Therefore, once the distance begins increasing the vehicle interface system 116 may transition from the command of the command stimulus output to the trigger details. Although, the command of the command stimulus output is described as preceding the trigger details, in some embodiments, the trigger details precede the command.

In this manner, the systems and methods described herein offer a multi-prong approach for controlling the vehicle interface system 116 to optimize the human perception for the driver 126. Firstly, the trigger threshold enables the systems and methods to determine whether a cooperative stimulus output or a command stimulus output is more appropriate. Secondly, the cooperative stimulus output and/or the command stimulus output may take a two-prong approach to optimizing the human perception based on the types of communications that are associated with the population group of the driver 126. Accordingly, the human perception can be optimized even as the current vehicle scenario escalates and deescalates, thereby improving the driving experience of the driver 126.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed herein.

The invention claimed is:

1. A computer-implemented method for controlling a vehicle interface system in vehicle, comprising:
   receiving images of a driver from an image capture device;
   determining a population group based on the images;
   identifying a human perception condition of the driver that is characteristic of the population group, wherein the human perception condition limits an ability of the driver to perceive a driving situation of a vehicle operation and a stimulus output that conveys information to the driver in the vehicle about the driving situation of the vehicle operation, wherein the stimulus output is controlled by the vehicle interface system;
   modifying the stimulus output into an optimal stimulus output that can be perceived by the driver with the human perception condition; and
   controlling the vehicle interface system to provide the optimal stimulus output to the driver during the vehicle operation.

2. The computer-implemented method of claim 1, wherein the population group is defined by characteristics based on demographic data, and wherein the characteristics include age and gender.

3. The computer-implemented method of claim 1, wherein identifying the human perception condition of the driver that is characteristic of the population group includes accessing a look-up table of human perception conditions associated with the population group.

4. The computer-implemented method of claim 3, including determining the optimal stimulus output based on the look-up table of human perception conditions and the vehicle operation.

5. The computer-implemented method of claim 1, wherein the human perception condition is limited neck movement that limits mobility of the driver to perceive the driving situation of the vehicle operation and a display output that conveys information to the driver in the vehicle about the driving situation of the vehicle operation.

6. The computer-implemented method of claim 5, wherein identifying the human perception condition of the driver that is characteristic of the population group includes identifying limited neck movement based on the images.

7. The computer-implemented method of claim 5, further including upon determining the population group is an advanced age population group and the vehicle operation is a back-up vehicle operation, modifying the display output into an optimal stimulus output with audio output describing the display output that can be perceived by the driver with the human perception condition.

8. The computer-implemented method of claim 1, wherein modifying the stimulus output into the optimal stimulus output that can be perceived by the driver with the human perception condition includes modifying a feature of the stimulus output.

9. A system for controlling a vehicle interface system in vehicle, comprising:
an image capture device that captures images of a driver;
an output device that provides a stimulus output that conveys information to the driver in the vehicle about a driving situation of a vehicle operation;
a processor operably connected for computer communication to the image capture device and the output device, wherein the processor:
determines a population group based on the images;
determines a human perception condition of the driver that is characteristic of the population group, wherein the human perception condition limits an ability of the driver thereby inhibiting the perception of the driver of the driving situation of the vehicle operation; and
modifies the stimulus output based on the population group and the human perception condition so that the stimulus output can be perceived by the driver during the vehicle operation.

10. The system of claim 9, further including a look-up table of human perception conditions associated with the population group stored at a memory accessible by the processor.

11. The system of claim 9, wherein the processor determines the population group of the driver by determining an age of the driver and a gender of the driver based on the images.

12. The system of claim 11, wherein the processor determines the a population group as an advanced age population group based on the age of the driver and the processor determines the human perception condition as limited body movement based the population group as the advanced age population group.

13. The system of claim 9, wherein upon determining the vehicle operation is a back-up vehicle operation, the processor modifies the stimulus output based on the population group and the human perception condition so that the stimulus output can be perceived by the driver during the vehicle operation to compensate for the ability of the driver limited by the human perception condition.

14. A non-transitory computer-readable storage medium including instructions that when executed by a processor, causes the processor to:
receive images of a driver in a vehicle from an image capture device;
determine a population group for the driver based on the images, wherein the population group is associated with a human perception condition that limits an ability of the driver to perceive a driving situation of the vehicle;
determine a cooperative stimulus output and a command stimulus output associated with the population group, wherein the cooperative stimulus output and the command stimulus output can be perceived by the driver with the human perception condition;
identify a trigger threshold based on the population group;
control the vehicle interface system to perform the cooperative stimulus output in response to a modification of a vehicle system and the trigger threshold not being met; and
control the vehicle interface system to perform the command stimulus output in response to the vehicle being in operation and the trigger threshold being met.

15. The non-transitory computer-readable storage medium of claim 14, wherein the modification of the vehicle system is based on vehicle sensor information associated with the driving situation of the vehicle.

16. The non-transitory computer-readable storage medium of claim 14, wherein the cooperative stimulus output includes a scenario communication and a suggestion communication.

17. The non-transitory computer-readable storage medium of claim 14, wherein the command stimulus output includes a command and trigger details.

18. The non-transitory computer-readable storage medium of claim 17, wherein the command encourages an immediate response from the driver and the trigger details convey information about the driving situation.

19. The non-transitory computer-readable storage medium of claim 14, wherein the trigger threshold is satisfied when a plurality of trigger thresholds are met.

20. The non-transitory computer-readable storage medium of claim 14, wherein the trigger threshold is satisfied when a first trigger threshold is met for a first population group, and the trigger threshold is satisfied when the first trigger threshold and a second trigger threshold are met for a second population group.

* * * * *